United States Patent
Hawksworth et al.

(10) Patent No.: US 10,707,742 B2
(45) Date of Patent: Jul. 7, 2020

(54) POLE-PIECE STRUCTURE FOR A MAGNETIC GEAR

(71) Applicant: Goodrich Actuation Systems Limited, Solihull, West Midlands (GB)

(72) Inventors: Andrew Hawksworth, Newport (GB); Paul Proverbs, Wolverhampton (GB)

(73) Assignee: GOODRICH ACTUATION SYSTEMS LIMITED, Shirley, Solihull (GB)

( * ) Notice: Subject to any disclaimer, the term of this patent is extended or adjusted under 35 U.S.C. 154(b) by 376 days.

(21) Appl. No.: 15/622,575

(22) Filed: Jun. 14, 2017

(65) Prior Publication Data
US 2017/0373582 A1 Dec. 28, 2017

(30) Foreign Application Priority Data
Jun. 23, 2016 (EP) .................................. 16275085

(51) Int. Cl.
| H02K 49/00 | (2006.01) |
| H02K 49/10 | (2006.01) |
| H01F 7/02 | (2006.01) |
| H01F 41/02 | (2006.01) |
| H02K 51/00 | (2006.01) |

(52) U.S. Cl.
CPC ......... H02K 49/102 (2013.01); H01F 7/0205 (2013.01); H01F 41/0266 (2013.01); H02K 51/00 (2013.01)

(58) Field of Classification Search
CPC .................................................. H02K 49/102
USPC ........................................................ 310/103
See application file for complete search history.

(56) References Cited

U.S. PATENT DOCUMENTS

| 8,575,804 B2* | 11/2013 | Nakatsugawa | ...... H02K 49/102 310/103 |
| 10,381,912 B2* | 8/2019 | Kimoto | .................... F16H 49/00 |
| 2012/0098374 A1* | 4/2012 | Curbelo | ............... H02K 49/106 310/103 |
| 2012/0194021 A1* | 8/2012 | Nakatsugawa | ...... H02K 49/102 310/103 |
| 2013/0320795 A1* | 12/2013 | Enomoto | ............. H02K 49/106 310/103 |

(Continued)

FOREIGN PATENT DOCUMENTS

| DE | 102014119267 A1 | 5/2016 |
| EP | 1353436 A2 | 10/2003 |

(Continued)

OTHER PUBLICATIONS

European Communication pursuant to Article 94(3) EPC, for Application No. 16275085.5-1201, dated Aug. 22, 2018, 8 pages.

(Continued)

*Primary Examiner* — Alexander Talpalatski
(74) *Attorney, Agent, or Firm* — Cantor Colburn LLP (57) ABSTRACT

The disclosure provides a pole-piece structure for a magnetic gear, comprising a plurality of laminate plates, wherein each plate comprises one or more apertures and an aperture in each plate aligns with an aperture in an adjacent plate to form one or more channels extending from a first end of the laminate plates to a second, opposite end of the laminate plates, wherein a resin cast is provided within each channel to hold the plurality of laminate plates together.

11 Claims, 7 Drawing Sheets

(56) References Cited

U.S. PATENT DOCUMENTS

| | | | | |
|---|---|---|---|---|
| 2014/0167546 A1* | 6/2014 | Sutani | ............... | H02K 49/102 |
| | | | | 310/103 |
| 2016/0006335 A1* | 1/2016 | Ohhashi | ............ | H02K 49/102 |
| | | | | 335/306 |

FOREIGN PATENT DOCUMENTS

| WO | 2015137392 A1 | 9/2015 |
|---|---|---|
| WO | 2015197067 A1 | 12/2015 |

OTHER PUBLICATIONS

European Search Report for Application No. 16275085.5-1809, dated Aug. 18, 2016, 24 pages.
European Communication pursuant to Article 94(3) EPC, for Application No. 16275085.5-1201, dated Jul. 10, 2019, 11 pages.

* cited by examiner

POLE-PIECE STRUCTURE FOR A MAGNETIC GEAR

FOREIGN PRIORITY

This application claims priority to European Patent Application No. 16275085.5 filed Jun. 23, 2016, the entire contents of which is incorporated herein by reference.

TECHNICAL FIELD

The present disclosure relates generally to a pole-piece structure for a magnetic gear, and methods of manufacturing same.

BACKGROUND

Magnetic gears are known and typically involve a concentric array of annular components that rotate relative to one another in order to rotate an output shaft at a different speed to an input shaft.

In one type of configuration, an inner permanent magnet can form an inner rotor and an outer permanent magnet can form an outer stator. A rotational pole-piece structure can be located between the inner and outer permanent magnets in order to provide a concentration of magnetic lines of force therebetween, and modulate the magnetic field so as to produce a gearing between the input and output shafts. The pole-piece structure forms a torque path between the input and output shafts without any mechanical contact. It is possible to vary the arrangement such that the pole-piece is a stator, and the two sets of permanent magnets rotate.

The gear ratio may be equal to the number of magnetic pole pairs on the permanent magnet associated with the high speed shaft, as compared to the number of magnetic pole pairs on the permanent magnet associated with the low speed shaft. This implies an even number of permanent magnets associated with each shaft.

Magnetic gears have known advantages in that, although bearings are required to mount the shafts in the gear assembly, the coupling between the moving parts is otherwise frictionless.

Pole-pieces, or "modulators" may be formed from laminate plates. Typically these are held together by a chassis or sub-carriage that extends through air gaps in the pole-piece. It is desired to provide improvements to the mounting of the pole-piece to the high or low speed shaft, or to the housing.

SUMMARY

In accordance with an aspect of the disclosure, there is provided a pole-piece structure for a magnetic gear, comprising: a plurality of laminate plates, wherein each plate comprises one or more apertures and an aperture in each plate aligns with an aperture in an adjacent plate to form one or more channels extending from a first end of the laminate plates to a second, opposite end of the laminate plates; wherein a solid, substantially non-magnetic material is provided throughout each channel to hold the plurality of laminate plates together.

The use of a solid, non-magnetic material to hold the plates together has been found to provide an improved structure as compared to conventional devices, which typically involve the use of further components such as a metal frame or housing located around the pole-piece to hold the pole-piece in position. In the present disclosure, the pole-piece may be held in position using the non-magnetic material provided throughout each channel.

The non-magnetic material may be non-metallic.

The non-magnetic material may be a resin, such that a resin cast may be formed throughout each channel. The resin may be an epoxy resin. The filler may be silica and the resin may be silica-filled epoxy resin. The silica may be silica nanoparticles. The resin may have a coefficient of thermal expansion of less then about $50 \times 10^{-6}/°C.$, $40 \times 10^{-6}/°C.$, $30 \times 10^{-6}/°C.$ or $20 \times 10^{-6}/°C.$ The apertures may be aligned such that the one or more channels formed by the apertures may run axially from the first end of the laminate plates to the second, opposite end of the laminate plates. The apertures may extend through the entire axial length of each plate.

Each aperture and/or channel may have a uniform width and/or cross-sectional area. The non-magnetic material may also have a uniform width and/or cross-sectional area, which may match that of the apertures and/or channel(s).

Each aperture and/or channel, and/or the non-magnetic material may have a rectangular, or rounded rectangular shape or cross-section. The non-magnetic material may have a substantially cuboid shape throughout each channel.

The one or more channels may extend in a direction parallel or substantially parallel to the longitudinal axis of the pole-piece structure, and/or the magnetic gear assembly (described below).

The non-magnetic material may be provided throughout each channel such that the non-magnetic material completely fills the channel.

There may be no air gaps within each channel and/or between the laminate plates and/or between the radial wall thickness of the plates.

The laminate plates may be stacked together and each plate may contact an adjacent plate along an entirety of its circumference.

The pole-piece structure may consist of the plurality of laminate plates and the non-magnetic material.

Each of the plates may comprise a plurality of solid portions arranged alternately with a plurality of substantially hollow portions, and the one or more apertures may be provided in the hollow portions. There may be at least 2, 4, 6, 8, 10, 12 or 14 solid portions and/or hollow portions in each of the plates, such that at least 2, 4, 6, 8, 10, 12 or 14 channels may be provided in the pole-piece structure. As discussed herein, a solid, substantially non-magnetic material is provided throughout each channel.

Each of the plates may be stacked such that the solid portions align so as to form a plurality of magnetic pole-pieces in the pole-piece structure.

The plates may be stacked such that the hollow portions align so as to form the one or more channels extending from a first end of the laminate plates to a second, opposite end of the laminate plates.

Each of the solid portions may be smooth and/or free of surface variations, such as protrusions, depressions, dimples, undulations, etc.

Each of the plates may comprise a uniform radial width (or radial wall thickness) and/or a uniform axial width, and may also be smooth and/or free of surface variations (other than the apertures formed by the hollow connecting portions).

Each of the laminate plates may be formed from a single piece of material, for example a metal (e.g., sheet metal).

In accordance with an aspect of the disclosure, there is provided a magnetic gear assembly comprising: a pole-piece structure as claimed in any preceding claim; a plurality of inner permanent magnets; and a plurality of outer permanent magnets located concentrically with respect to the inner permanent magnets; wherein the pole-piece structure is located between the inner and outer permanent magnets and modulates the magnetic fields produced by the inner and outer permanent magnets.

The pole-piece structure may be located between first and second rotating components of the magnetic gear assembly. The first and second rotating components may be associated with the input shaft or the output shaft. The first and second rotating components may be located at opposite axial ends of the magnetic gear assembly.

The solid, substantially non-magnetic material may comprise cavities at each axial end, and the first and second rotating components may comprise flanges that extend into the cavities, so as to hold the pole-piece structure in position. The flanges may at least partially extend into each channel.

In accordance with an aspect of the disclosure, there is provided a method of forming a pole-piece structure, comprising: stacking a plurality of plates against one another, wherein each plate comprises one or more apertures and an aperture in each plate aligns with an aperture in an adjacent plate to form one or more channels extending from a first end of the laminate plates to a second, opposite end of the laminate plates; and casting or molding a substantially non-magnetic material (e.g., a resin as described above) within each of the one or more channels, such that a solid, substantially non-magnetic material is provided within each channel that holds the plurality of laminate plates together.

The apertures may be located at the same circumferential location on each plate, and the plates may be stacked such that the apertures align and the channels extend in a direction parallel or substantially parallel to the longitudinal axis of the pole-piece structure.

The pole-piece structure may initially be held in place by a clamp or other suitable holding mechanism. The non-magnetic material may be injected into each of the channels. The clamp or other suitable holding mechanism may be removed once all of the channels have been cast or molded with the non-magnetic material.

The pole-piece structure according to this method may have any of the features of the pole-piece structure described above.

In accordance with an aspect of the disclosure, there is provided a method of forming a magnetic gear assembly, comprising: forming a pole-piece structure as described above, wherein the step of stacking said plurality of plates comprises stacking the plates between a first rotating component of the magnetic gear assembly and a second rotating component of the magnetic gear assembly.

The step of casting or molding a substantially non-magnetic material may be carried out after the step of stacking the plurality of plates between first and second rotating components of the magnetic gear assembly.

The first and second rotating components may be associated with the input shaft or the output shaft. The first and second rotating components may be located at opposite axial ends of the magnetic gear assembly.

BRIEF DESCRIPTION OF THE DRAWINGS

Various embodiments will now be described, by way of example only, and with reference to the accompanying drawings in which.

DETAILED DESCRIPTION

The disclosure relates generally to a pole piece structure (or "modulator") for use in, e.g. a magnetic gear or a magnetic gear assembly, and methods of manufacturing a pole-piece structure (or "modulator").

Figure 1:
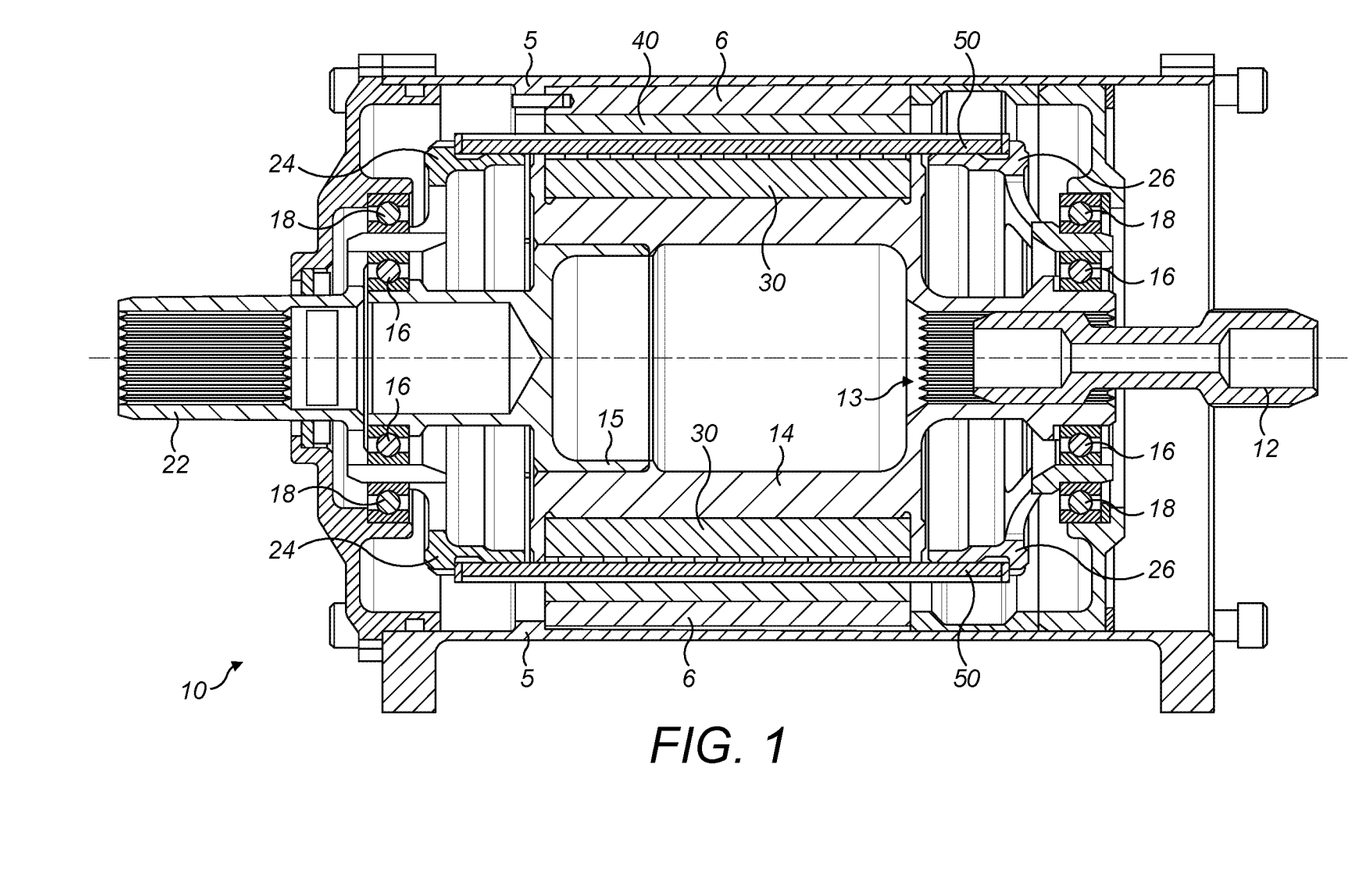
FIG. 1 shows an axial cross-section through a magnetic gear assembly.

FIG. 1 shows a magnetic gear assembly 10 in accordance with an embodiment.

The magnetic gear assembly 10 comprises a housing 5, as well as an input shaft 12 and an output shaft 22. The input shaft 12 connects to an inner rotor 14 via, e.g. a spline connection 13, and the inner rotor 14 connects to an inner rotor support 15. The inner rotor 14 and inner rotor support 15 rotate together and are supported by inner bearings 16. The inner rotor 14 and inner rotor support 15 and/or the input shaft 12 could be a single-piece component.

The inner rotor 14 supports an array of inner permanent magnets 30 that rotate together with the input shaft 12 and inner rotor 14.

The housing 5 is fixed in relation to the moving parts of the magnetic gear assembly 10, and supports an array of outer permanent magnets 40. The outer permanent magnets 40 are fixed to the housing 5 via an outer support 6.

A pole-piece structure or modulator 50 is located between the outer permanent magnets 40 and the inner permanent magnets 30. The modulator 50 is carried by one or more extensions 24 of the output shaft 22 and a modulator support 26. The extensions 24 and modulator support 26 are carried by inner bearings 16 and outer bearings 18 and, with the modulator 50, are rotatable with the output shaft 22.

The modulator 50 is made of a magnetic material and acts to modulate the magnetic fields produced by the inner and outer permanent magnets. To do this, the modulator 50 comprises a number of magnetic poles that are regularly spaced around its circumference, which provide flux harmonics corresponding to the magnet pole pairs on the inner and outer permanent magnets. This causes the components to interact in a magnetically-geared manner. The modulator 50 may form a torque path between the input shaft 12 and the output shaft 22 without any mechanical contact. Such theory is known in the art and will not be repeated herein.

In the illustrated embodiment, the outer permanent magnets 40 do not rotate, although other embodiments are contemplated in which the outer permanent magnets 40 rotate and the pole-piece structure 50 is fixed. Also, in the illustrated embodiment the input shaft 12 and inner rotor 14 is configured as a high-speed rotor and the modulator 50 and output shaft 22 are configured as the low-speed rotor. This is due to the lower number of inner permanent magnets 30 when compared to the number of outer permanent magnets 40. However, other embodiments are contemplated in which the inner rotor 14 is configured as the low-speed rotor, by using a higher number of inner permanent magnets than outer permanent magnets.

Figure 2:
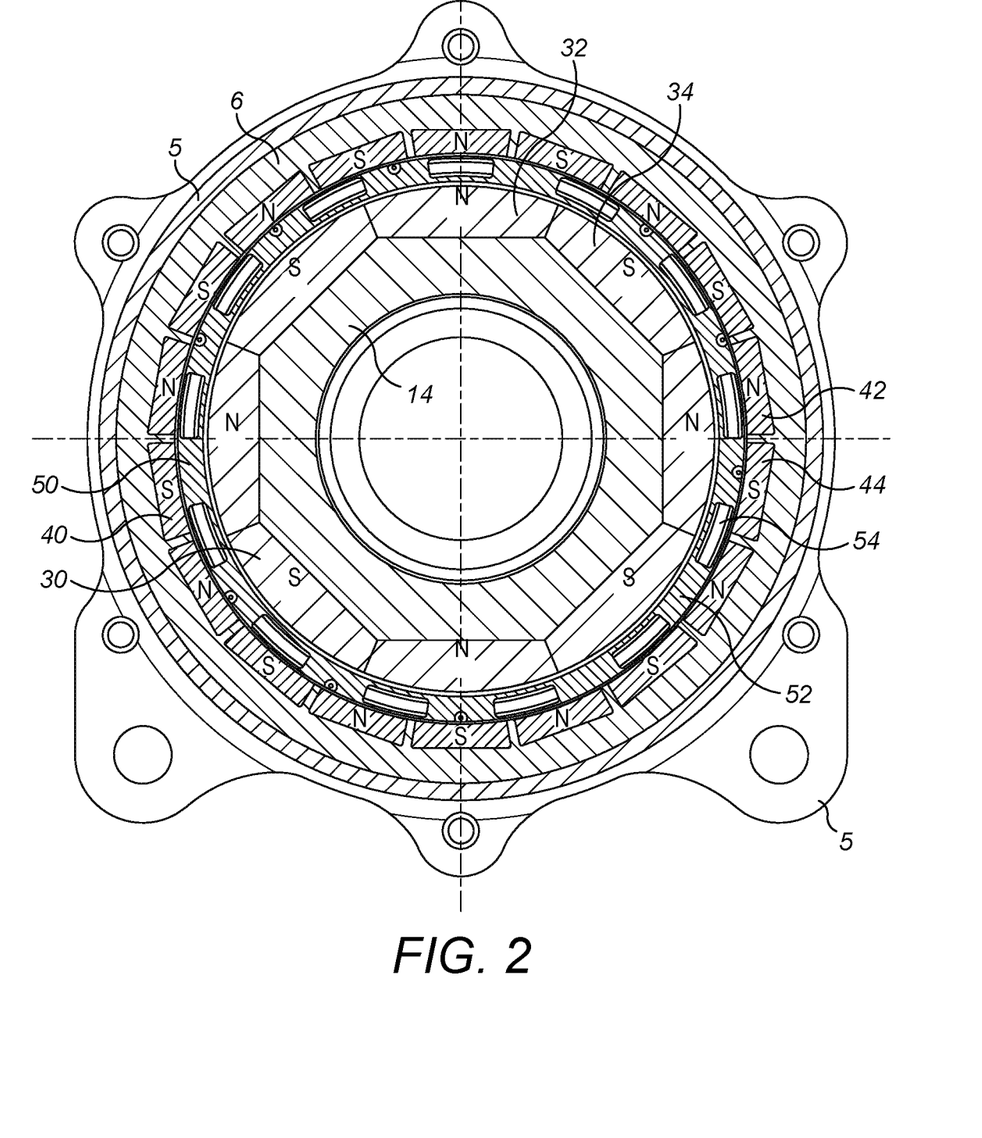
FIG. 2 shows a radial cross-section through the magnetic gear assembly shown in FIG. 1.

FIG. 2 shows a radial cross-section through the magnetic gear assembly 10.

The inner rotor 14 supports the inner permanent magnets 30. In the illustrated embodiment, eight inner permanent magnets are used but any number can be used as required. The inner permanent magnets are arranged in alternating north 32 and south 34 poles. Similarly, the outer permanent magnets 40 comprise alternating north 42 and south 44 poles. Eighteen alternating poles are used in the illustrated embodiment, although any number can be used as required.

The modulator 50 comprises an array of regularly spaced magnetic portions 52 and substantially non-magnetic portions 54, which are arranged in an alternating pattern. The magnetic portions 52 may be a solid piece of a magnetic metal, and the substantially non-magnetic portions 54 may comprise apertures. These are described in more detail below. As illustrated, the number of magnetic and non-magnetic parts is chosen to be twenty-six, i.e. the sum of the inner and outer permanent magnets, although any number can be used as required.

A nominal air gap (not shown) is present between the modulator 50 and each of the inner and outer arrays of permanent magnets 30, 40. This means that torque is transferred between the rotating magnetic parts of the magnetic gear assembly 10 in a frictionless manner.

The pole-piece structure or modulator 50 is formed from a plurality of laminate plates 100 that are stacked together. The plates may be formed from or comprise silicon-iron.

Figure 3A:
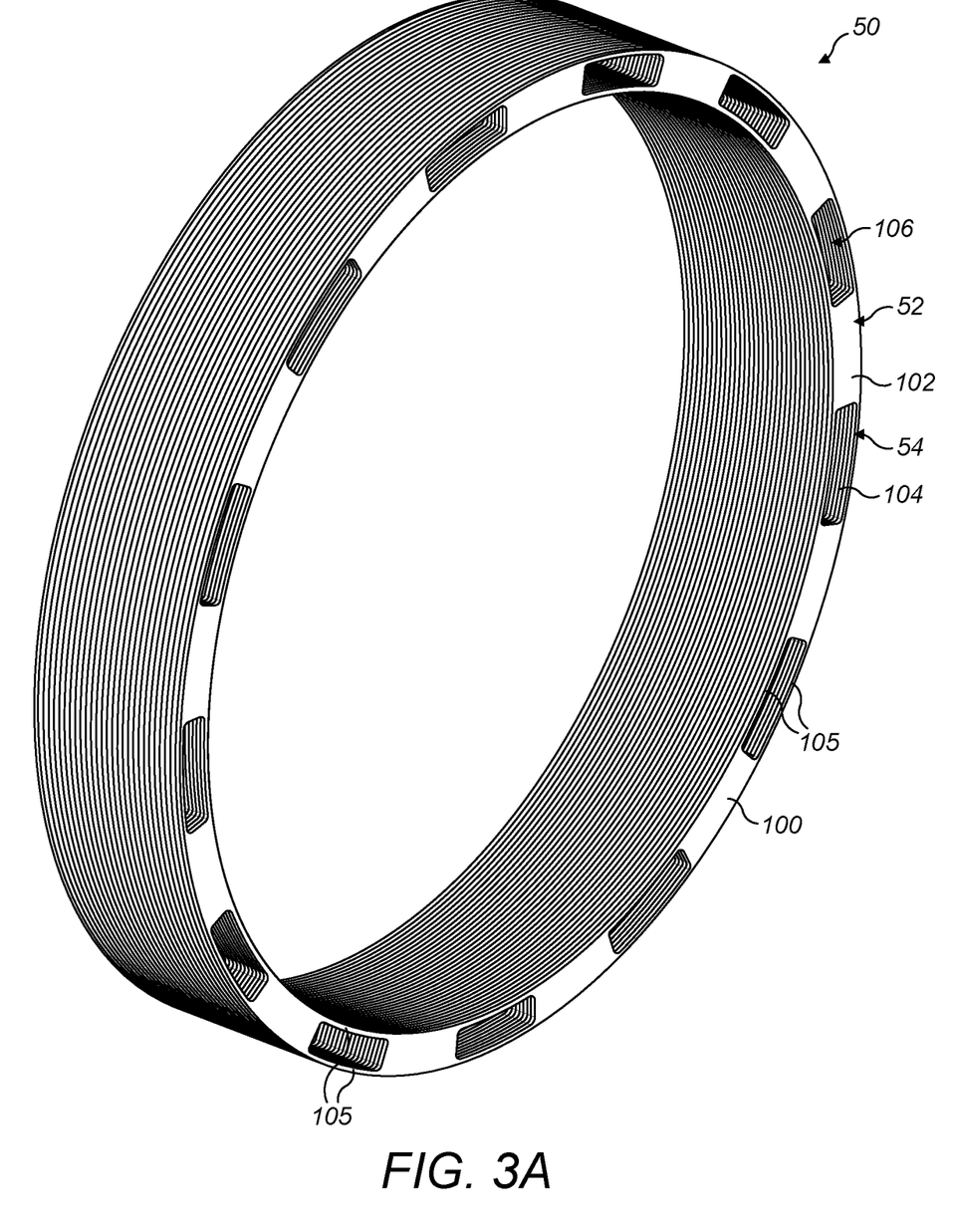
FIG. 3A shows the laminate plates in isolation.

As shown in FIG. 3A, each plate 100 may comprise a ring having a plurality of regularly spaced and solid portions 102 that are separated by hollow connecting portions 104. The connecting portions 104 comprise one or more connectors 105 (FIG. 3C) that extend circumferentially between the solid portions 102 to connect the solid portions 102 together. In the illustrated embodiment, two narrow connectors 105 are provided for each hollow portion 104, although a single connector or more than two connectors may be used as appropriate. Optionally, each plate 100 is a single-piece of magnetic metal.

When stacked together, the solid portions 102 of the laminate plates 100 align and form the magnetic portions 52 of the modulator 50. Similarly, when stacked together the hollow connecting portions 104 of the laminate plates 100 align to form the substantially non-magnetic portions 54 of the modulator 50. The word "substantially" is used to indicate that, whilst the hollow portions may still comprise metal (e.g. magnetic) connectors 105, the hollow portions 104 are mainly void between the connectors 105 to provide non-magnetic channels, as discussed in more detail below.

The hollow portions 104 comprise apertures, which apertures are the voids between the connectors 105 and the sides of the solid portions 102. Thus, an aperture in each plate 100 aligns with an aperture in an adjacent plate 100 to form one or more channels 106 extending from a first end of the laminate plates to a second, opposite end of the laminate plates.

Figure 3B:
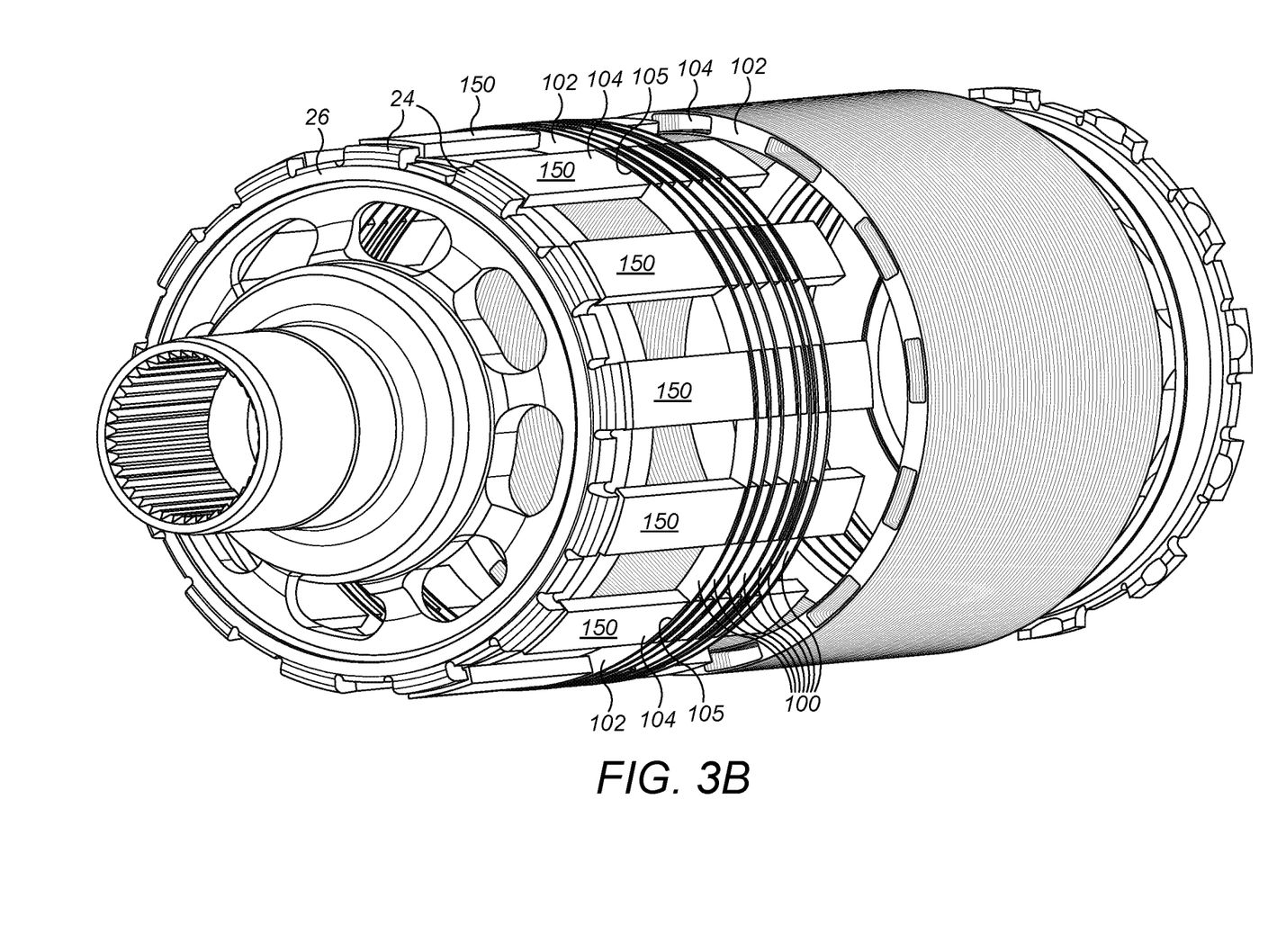
FIG. 3B shows an exploded view of the pole-piece structure.

Referring now to FIG. 3B, this shows the laminate plates 100 in a semi-assembled state. In order to hold the laminate plates 100 in position, a non-magnetic material 150 is provided throughout each channel 106 to hold the plurality of laminate plates 100 together. In the illustrated embodiment the non-magnetic material is a resin cast 150 that extends throughout each channel 106 formed by the apertures in the hollow portions 104 of the plates 100. Each resin cast 150 extends from the first end of the laminate plates to the second, opposite end of the laminate plates.

Each extension 24 of the modulator support 26 extends into a respective one of the resin casts 150, which secures the modulator 50 to the output shaft 22 and modulator support 26. This facilitates assembly of the magnetic gear assembly 10 since the extensions 24 may be inserted into respective ends of the modulator 50.

The resin material is substantially non-magnetic and/or otherwise has no magnetic permeability and will not affect or influence the magnetic performance of the gearbox.

Some conventional arrangements use a chassis or subcarriage to carry the modulator. Such arrangements may have included bolts extending through the modulator to hold it together, or a bonding material such as glue. It has been found that this type of architecture can compromise the performance of the magnetic gear. This may be due to the inclusion of metal bolts through the plates, or perforations and/or indentations in the solid magnetic portions, leading to losses in performance and efficiency. The broadest aspects of the present disclosure overcome this by using a resin cast within each channel to hold the plurality of laminate plates together.

The use of resin casts (or other non-magnetic material) extending through the structure of the modulator also means that the plates, while pressed against each other, are not connected to one another for example by welding or other means. This increases the magnetic permeability between the plates further, since a weld could potentially introduce some unwanted eddy currents by creating a path for torque to be transmitted.

The resin casts 150 may be formed prior to attachment of the modulator 50 to the rest of the assembly. Alternatively, the resin could be injected into a partially formed or near-complete assembly.

In accordance with the disclosure, each plate 100 is held in position through the use of one or more resin casts 150 extending axially throughout the modulator 50. When the structure is formed, substantially all of the channel(s) may be filled with resin, and this may prevent radial movement of the plates. There may be substantially no air gaps in the modulator 50, for example between the plates and/or within the channels.

Using a resin cast in the manner described herein means that the laminate plates 100 can be formed without any indentations or other surface features. The solid portions 105 may be smooth, for example, and/or both sides of each plate 100 may be flat. This is because they are not required to attach to one another, as they may be clamped together between the output shaft 24 and modulator support 26. Some of the plates 100 are shown in FIG. 3B in isolation, from which it can be seen that each plate 100 may be flat and smooth on both sides. This smoothness further increases the magnetic permeability between the plates.

The resin material may be arranged and configured to transmit torque to the output shaft. This is achieved in the illustrated embodiment by connecting the resin casts 150 to extensions 24 and modulator support 26, so that movement (e.g., rotation) of the resin casts 150 due to the pole-pieces of the modulator 50 causes movement (e.g., rotation) of the extensions 24 and modulator support 26, and in turn rotation of the output shaft 22. In other words, the resin casts 150 are on the primary load path of the magnetic gear, and transmit torque to the output shaft 22.

Figure 4A:
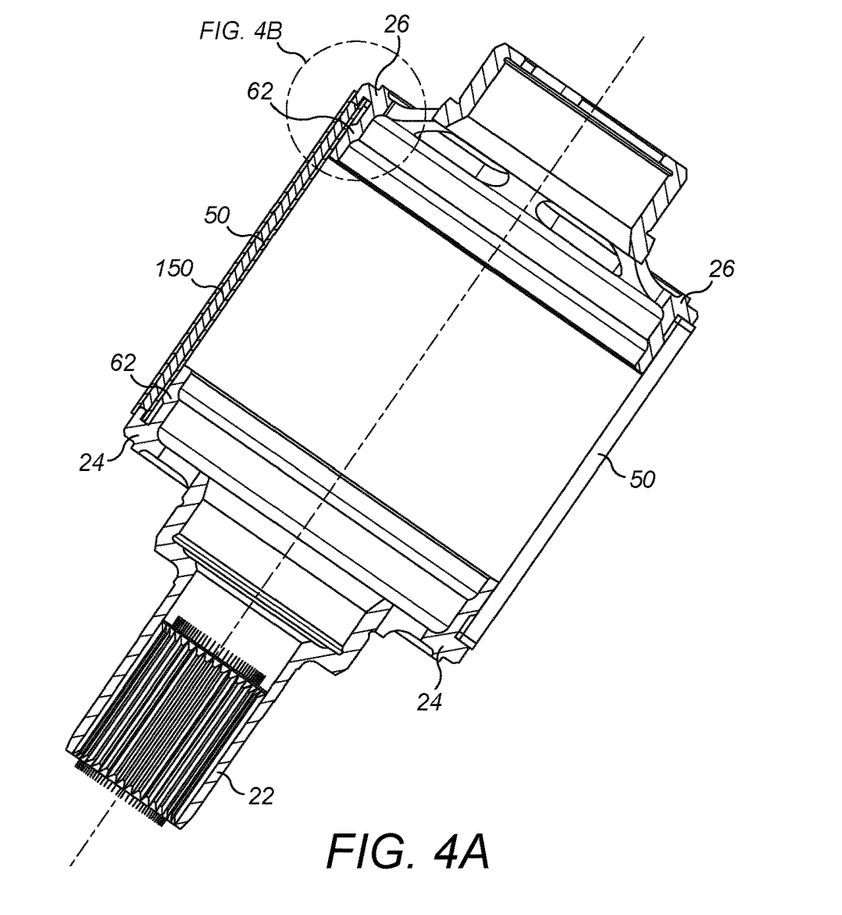
FIG. 4A shows a cross-section through part of the magnetic pole-piece structure of FIG. 3.
Figure 4B:
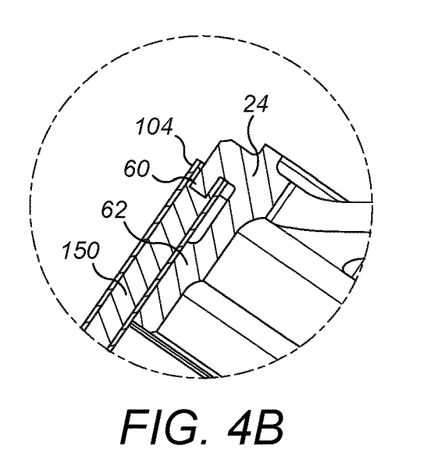
FIG. 4B shows a close up of part of FIG. 4A.

FIG. 4A shows a cross-section through the output shaft 22, extensions 24, modulator support 26 and modulator 50 of the embodiment of the pole-piece structure 10 described above. For clarity, other components of the pole-piece structure 10 are not shown. FIG. 4B shows a close-up of part of FIG. 4A.

It can be seen from FIGS. 4A and 4B that the modulator 50 is connected to the output shaft 22 using a plurality of lips 60 that extend into respective hollow portions 156 located at opposite ends of each resin cast 150. The extensions 24 and modulator support 26 also comprise respective annular platforms 62 that support an inner surface of the modulator 50.

Figure 5:
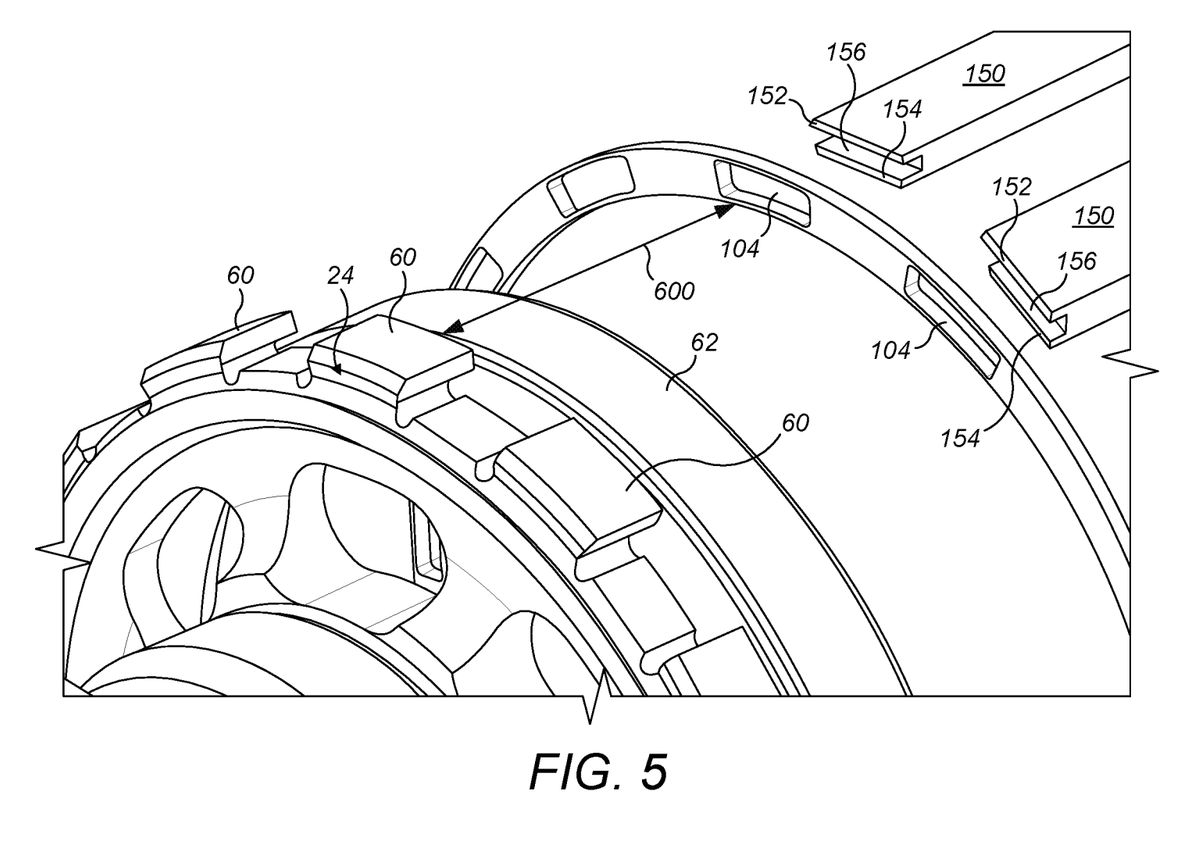
FIG. 5 shows a perspective view of a connection between two parts of the pole-piece structure of FIG. 4.

FIG. 5 shows a perspective view of the components shown in FIG. 3 prior to their assembly, as well as further details of the end of each resin cast 150. Some features are omitted for clarity purposes.

Each resin cast 150 terminates in an end portion comprising a first flange 152 and a second flange 154, wherein the hollow portions 156 are located between the first flange 152 and the second flange 154. As will be appreciated, the modulator 50 and extensions 24 may be moved towards one another in the direction of arrow 600, and the lips 60 slot into respective hollow portions 156 (or cavities) of the resin casts 150 to secure the modulator 50 to the output shaft 22. The platform 62 slides underneath the modulator 50 whilst maintaining contact to provide its function of supporting the modulator 50 in use. The same procedure is used to insert the modulator support 26 into the modulator 50.

Other arrangements for connecting the modulator 50 to the output shaft 22 are contemplated, and the broadest aspects of this disclosure are not limited to the arrangements shown in respect of FIGS. 4A, 4B and 5.

Figure 6:
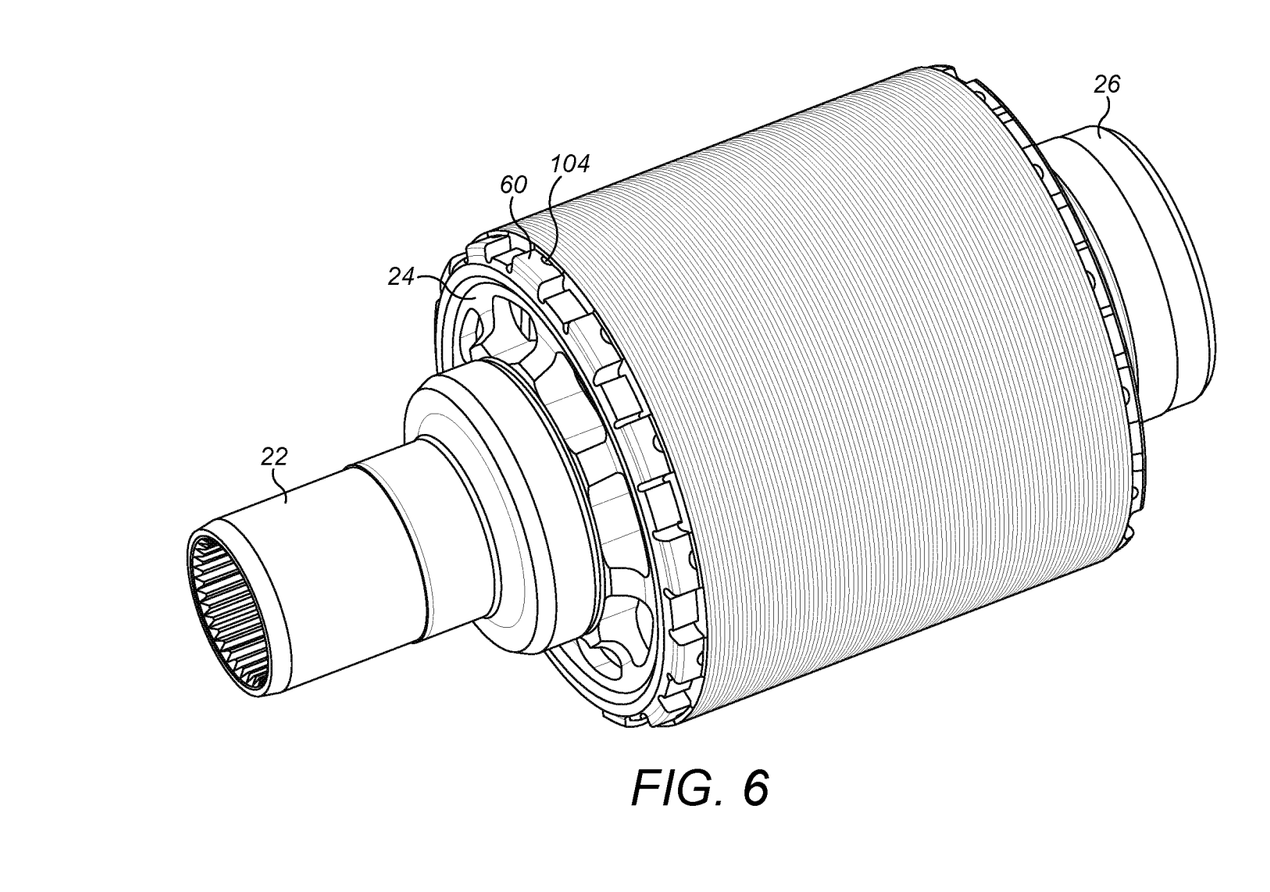
FIG. 6 shows a perspective view of part of the pole-piece structure of FIG. 4.

FIG. 6 shows the modulator 50 connected to and assembled with the output shaft 22, extensions 24 and modulator support 26. It can be seen that the lips 60 extend into respective hollow portions of the resin casts 150 as discussed above.

Although the present disclosure has been described with reference to preferred embodiments, it will be understood by those skilled in the art that various changes in form and detail may be made without departing from the scope of the accompanying claims.

The invention claimed is:

1. A magnetic gear assembly, comprising:
    a rotating pole-piece structure comprising a longitudinal axis and a plurality of laminate plates, wherein each of said laminate plates is a ring formed from a single piece of material comprising one or more apertures and an aperture in each plate aligns with an aperture in an adjacent plate to form one or more channels extending from a first axial end of the laminate plates to a second, opposite axial end of the laminate plates;
    a first rotating component;
    a second rotating component;
    a plurality of inner permanent magnets; and
    a plurality of outer permanent magnets located concentrically with respect to said inner permanent magnets;
    wherein said pole-piece structure is located radially between said inner and outer permanent magnets and modulates the magnetic fields produced by said inner and outer permanent magnets, and the pole-piece structure is located axially between the first and second rotating components of the magnetic gear assembly;
    wherein a solid, substantially non-magnetic material is provided throughout each channel to hold the plurality of laminate-plates together;
    wherein the solid, substantially non-magnetic material comprises cavities at each first and second axial end, and each of the first and second rotating components comprise flanges that extend into the cavities, so as to hold the pole-piece structure in position
    wherein the non-magnetic material comprises a resin that is provided throughout each channel, wherein the resin completely fills each channel.

2. The magnetic gear assembly as claimed in claim 1, wherein the apertures are aligned such that the one or more channels formed by the apertures run axially from the first end of the laminate plates to the second, opposite end of the laminate plates.

3. The magnetic gear assembly as claimed in claim 2, wherein the one or more channels extend in a direction parallel or substantially parallel to the longitudinal axis of said pole-piece structure.

4. The magnetic gear assembly as claimed in claim 1, wherein there are no air gaps within each channel and/or between the laminate plates.

5. The magnetic gear assembly as claimed in claim 1, wherein the laminate plates are stacked together and each plate contacts an adjacent plate along an entirety of its circumference.

6. The magnetic gear assembly as claimed in claim 1, wherein said pole-piece structure consists of said plurality of laminate plates and said non-magnetic material.

7. The magnetic gear assembly as claimed in claim 1, wherein each of said plates comprises a plurality of solid portions arranged alternately with a plurality of substantially hollow portions, and said one or more apertures are provided in said hollow portions.

8. The magnetic gear assembly as claimed in claim 7, wherein each of said plates are stacked such that said solid portions align so as to form a plurality of magnetic pole-pieces in said pole-piece structure.

9. The magnetic gear assembly as claimed in claim 7, wherein said plates are stacked such that said hollow portions align so as to form said one or more channels extending from a first end of the laminate plates to a second, opposite end of the laminate plates.

10. The magnetic gear assembly as claimed in claim 7, wherein each of said solid portions are smooth and/or free of surface variations.

11. The magnetic gear assembly as claimed in claim 1, wherein each of said plates comprises a uniform radial width and a uniform width.

* * * * *